United States Patent [19]

Merio

[11] Patent Number: 4,869,688
[45] Date of Patent: Sep. 26, 1989

[54] BATTERY JUMPER CABLE

[75] Inventor: Raoul Merio, Vienna, Austria

[73] Assignee: System Elektrotechnik G. Keller GmbH, Austria

[21] Appl. No.: 88,267

[22] Filed: Aug. 24, 1987

[30] Foreign Application Priority Data

Sep. 2, 1986 [AT] Austria .................. 2363/86
Jul. 6, 1987 [DE] Fed. Rep. of Germany ....... 3722286

[51] Int. Cl.$^4$ .............................. H01R 11/00
[52] U.S. Cl. ..................... 439/504; 320/20; 439/503
[58] Field of Search .......... 320/20, 5, 25, 26, 48, 320/2; 439/503-504, 754

[56] References Cited

U.S. PATENT DOCUMENTS

| | | | |
|---|---|---|---|
| 3,259,754 | 7/1966 | Matheson | 439/504 |
| 3,614,582 | 10/1971 | Burkett et al. | 320/20 |
| 3,767,994 | 10/1973 | Dittmar et al. | 320/20 |
| 3,992,658 | 11/1976 | Bechtold et al. | 320/20 |
| 4,145,648 | 3/1979 | Zender | 439/504 |
| 4,238,722 | 12/1980 | Ford | 320/25 |
| 4,272,142 | 6/1981 | Zapf | 439/504 |
| 4,366,430 | 12/1982 | Wright | 439/504 |
| 4,431,925 | 2/1984 | Frisbee et al. | 439/504 |
| 4,467,265 | 8/1984 | Hierholzer, Jr. | 320/20 |
| 4,483,910 | 11/1984 | Julian | 439/504 |
| 4,488,147 | 12/1984 | Signorile | 320/48 |
| 4,568,869 | 2/1986 | Graham, Jr. | 320/20 |
| 4,607,209 | 8/1986 | Guim et al. | 439/504 |
| 4,620,767 | 11/1986 | Woolf | 439/504 |
| 4,767,977 | 8/1988 | Fasen et al. | 320/20 |

FOREIGN PATENT DOCUMENTS 2920979 11/1980 Fed. Rep. of Germany.
2718188 7/1984 Fed. Rep. of Germany.
3228471 3/1985 Fed. Rep. of Germany.

OTHER PUBLICATIONS

DIN 72,553 "Starthilfekabel fur Strassenfahrzenge mit Verbrennungsmotor"; Jan. 22, 1987.

Primary Examiner—P. Austin Bradley
Attorney, Agent, or Firm—Leydig, Voit & Mayer

[57] ABSTRACT

A battery jumper cable comprises a first electrically insulated flexible low-voltage conductor having two end portions each electrically connected to a pair of pole pliers and a second electrically insulated flexible low-voltage conductor having two end portions each electrically connected to an insulated pair of pole pliers. To prevent the occurrence of high peak voltages which may affect vehicle electronics during a jumper operation between a powering storage battery of the one vehicle and a discharged storage battery of another vehicle, there is provided at least one electrical connection between the first low-voltage conductor and the second low-voltage conductor. This electrical connection has at least one voltage-dependent resistor exhibiting a forward voltage in excess of the operating voltage of conventional starting batteries for automotive vehicles. The voltage-dependent resistor may be accommodated within a housing.

23 Claims, 7 Drawing Sheets

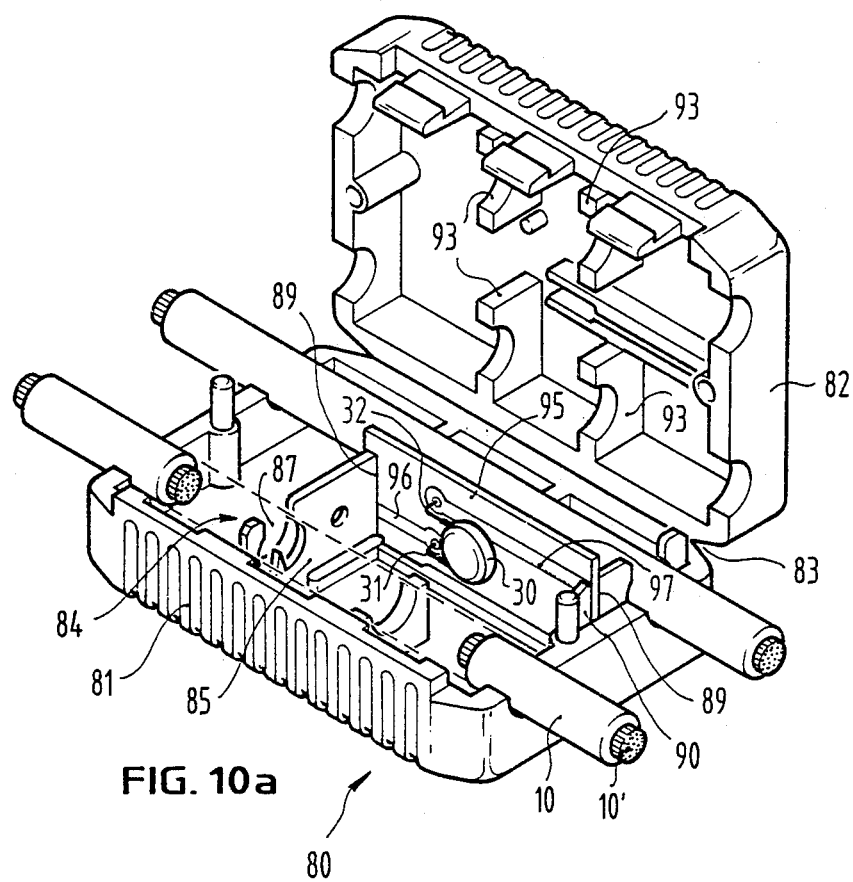
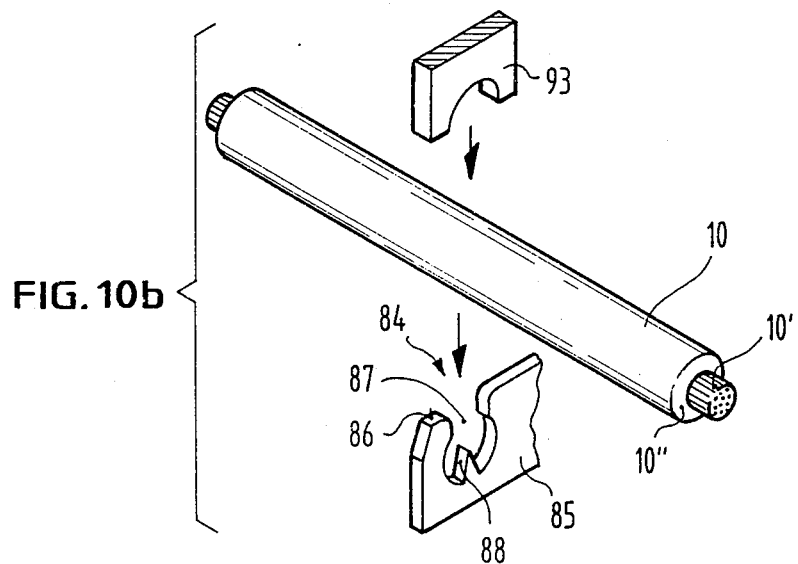

BATTERY JUMPER CABLE

BACKGROUND OF THE INVENTION

The invention relates to battery jumper cables and particularly to those comprising a first electrically insulated flexible low-voltage conductor having each end portion electrically connected to a pair of electrically insulated pole pliers, and a second electrically insulated flexible low-voltage conductor having each end portion electrically connected to a pair of electrically insulated pole pliers.

Known conventional battery jumper cables (see for instance DIN 72,553 in the draft version of February 1987) are intended for use with a first vehicle having internal combustion engines for temporarily transmitting electrical power required for starting from a storage battery of a second vehicle.

German patent specification Nos. 2,718,188 and 3,228,471 disclose surge arresters for diverting lightning stroke currents, comprising a varistor and a surge arrester which is electrically connected in parallel therewith and having a lightning stroke current-carrying air spark gap. Further, German Laid-open Publication 2,920,979 discloses a surge arrester for protecting low-voltage switchgear, including a metal oxide varistor and a surge arrester connected in parallel therewith and having an air spark gap. However, such surge arresters have not been used so far in conjunction with battery jumper cables.

For many years motor vehicles have included electronic systems and components, for instance in ignition electronics and in fuel injection systems. Anti-skid and anti-slip systems developed recently also comprise a considerable number of electronic components.

It has been found that considerable reactive peak voltages may occur when conventional battery jumper cables are used. Especially when the storage battery of the second vehicle is the starting battery and the engine of the second vehicle is running when the pairs of pole pliers are removed from the battery terminals after the jumping operation has been successful, high peak voltages may occur which are accompanied by considerable spark formation. Within a range of micro- or milliseconds, voltages in excess of 1000 V may occur, which present a grave risk to expensive electronic parts and components of modern vehicles.

SUMMARY OF THE INVENTION

It is the object of the present invention to provide a battery jumper cable which can be used universally in varied types of motor vehicles while reliably preventing the occurrence of high peak voltages affecting the vehicle electronics when a jumper operation is to be performed.

This object is achieved in accordance with the present invention by providing a first and second insulated flexible low-voltage conductor, each having a first and second end and a first and second pair of pole pliers at the first and second end respectively, and a means for electrically connecting the first low-voltage conductor and the second low-voltage conductor or the first pole pliers and the second pole pliers thereof, the connecting means comprising a voltage-dependent resistor, the forward voltage of said resistor exceeding the operating voltage of conventional starting batteries for motor vehicles. Preferably, the forward voltage exceeds the battery operating voltage by at least 20 to 60 V.

The electrical connection preferably is a third electrically insulated flexible conductor. Alternatively, the electrical connection may consist of two connecting sections through which each voltage-dependent resistor is connected to the first low-voltage conductor, on the one hand, and to the second low-voltage conductor, on the other hand.

The voltage-dependent resistors may, for instance, be varistors, especially metal oxide varistors, and an analogously acting array of circuit elements. Such analogously acting arrays of circuit elements may be, for example, two anti-parallel connected Z-diodes, thyristors or an array comprising two anti-parallel connected thyristors (Triac). Preferably, the voltage-dependent resistor is a parallel-connected array of a metal oxide varistor and a gas-filled surge arrester. The forward voltage of the metal oxide varistor is preferably in the range of about 40 to 60 V, and the forward or response voltage of the gas-filled surge arrester is 90 V or more, so that, especially in the case of high peak voltages, the gas-filled surge arrester serves as a protective circuit for the metal oxide varistor.

The battery jumper cable with protective electronic circuit according to the present invention is well suited for 12 V and 24 V starting batteries typically employed in conventional motor vehicles with spark-ignition and compression-ignition engines.

Safety requirements for battery jumper cables are specified, for instance, in DIN 72,553 (in the draft version of February 1987).

Typically, the low-voltage conductors have conductor cross-sections of 16, 25 or 35 mm$^2$. The conductor material and the insulating material are designed for an operating temperature range from $-25°$ C. to $+70°$ C. At $-25°$ C. the battery jumper cable must be capable of being unbent from a wound ring-like state to the elongated state necessary for the jumping operation. The pairs of pole pliers are preferably fully insulated; this means that with a closed, nonterminated pair of pole pliers no electrical contact may be made when electrically conductive surfaces or another pair of pole pliers are touched. Such fully-insulated pairs of pole pliers preferably comprise two shell-like halves of plastic material having clamping pieces in which metallic jaws are inserted to electrically connect an end portion of a low-voltage conductor. Alternatively, pairs of pole pliers—especially those intended for export—may consist of sheet steel pliers or the like wherein only the handles are electrically insulated with a plastic sheath.

The voltage-dependent resistor provided in the protective electronic circuit of the jumper cable according to the present invention has the function of a "voltage-dependent switch". Below its forward voltage, this voltage-dependent resistor or switch blocks the electrical connection so that during the normal jumping operation, in which voltages of up to 30 V may typically occur, no current will flow via the electrical connection so that, in spite of the presence of an electrical connection, a short-circuit between the first and the second low-voltage conductor is reliably prevented. Above its forward voltage, which is preferably in the range of about 40 to 60 V, the resistance of the voltage-dependent resistor or of the analogously acting array of circuit elements will rapidly decrease so that on occurrence of higher voltages current may flow via the electrical connection. The currents corresponding to the short-time peak voltages are thereby shorted via the electrical connection between the first and the second low-voltage conductor and cannot affect the expensive components of the vehicle electronics.

Preferably, the battery jumper cable according to the present invention comprises two electrical connections in each of which at least one voltage-dependent resistor is disposed. The voltage-dependent resistor preferably is a parallel-connected array of a varistor, especially of a metal oxide varistor, and a gas-filled surge arrester.

The electrical connection preferably may be a third electrically insulated flexible conductor which is electrically connected to the first low-voltage conductor and to the second low-voltage conductor and/or to the first and second pole pliers thereof.

The cross-section of such a third conductor may be significantly smaller than the cross-section of the low-voltage conductors, which typically have cross-sections of 16, 25 or 35 mm$^2$, whereas the third conductor preferably has a cross-section in the range of about 2 to 8 mm$^2$ so that, upon completion of a jumper operation, the self-induction within said third conductor is minimized.

The end portions or terminals of each third conductor are electrically connected to the first and the second low-voltage conductor, respectively. Preferably, the connection is in close proximity to the two adjacent end portions of the first and the second low-voltage conductor. It is especially preferred that the terminals of each third conductor directly engage the conductive metallic portions of the first and second pole pliers electrically connected to the adjacent end portions of the first and the second low-voltage conductors. This arrangement likewise helps to minimize self-induction.

On the one hand, the length of each third conductor should be small so as to minimize self-induction while, on the other hand, it should be sufficient to ensure unimpeded manipulation and universal use of the jumper cable even when the pairs of first and second pole pliers at the two adjacent ends of the first and second low-voltage conductors are interconnected via such a third conductor. In such a case, a length of about 60 to 100 cm, especially 80 cm, for each third conductor has proved satisfactory and is preferably provided. Then, even the distance between the poles of multi-cell starting batteries of trucks can be readily be bridged and convenient handling is ensured.

For the insulation of the third conductor, typical flexible insulating materials are used such as are employed for the low-voltage conductors of conventional jumper cables. The insulating material is required to have flame-retardant properties and must be flexible at least within a temperature range of $-25°$ C. to $+70°$ C. The insulating material must be resistant to lubricants and fuel.

The voltage-dependent resistor is preferably arranged approximately in the middle between the two "outer" terminals of a third conductor. The arrangement and connection between the "inner" terminals of the third conductor(s) adjacent the resistor and the voltage-dependent resistor are provided such that a current flowing through the third conductor must necessarily pass through the voltage-dependent resistor. When a third conductor has two or, in some cases, even more voltage-dependent resistors associated therewith, a mutually parallel connection or array of all voltage-dependent resistors is provided so that at least one resistor may serve as protective means for another resistor.

According to an alternative embodiment of the invention, each electrical connection between the first and the second low-voltage conductors may consist merely of the two connecting portions through which each voltage-dependent resistor is electrically connected, on the one hand, to the first low-voltage conductor and, on the other hand, to the second low-voltage conductor. For instance, the corresponding portions of the first and the second low-voltage conductor can be mechanically fixed within a housing in which at least one voltage-dependent resistor is provided, the forward voltage of which is in excess of the operating voltage of conventional starting batteries. This voltage-dependent resistor is electrically connected via its one connecting portion to the first low-voltage conductor while it is electrically connected via its other connecting portion to the second low-voltage conductor. Said connecting portions may, for instance, be configured as conductive track sections on a p.c. board on which the two low-voltage conductors are secured by terminals or the like and on which at least one voltage-dependent resistor is arranged or formed. Furthermore, these connecting portions may be the contacts of a conventional insulation-piercing connector for piercing the insulation of the low-voltage conductor and making contact with the copper wire thereof. Moreover, each connecting portion may be a connector pin injection-moulded in the housing and making electrical contact with the wires of the low-voltage conductors when the housing is closed.

Preferably, this alternative embodiment also comprises two housings disposed at an approximate distance of about 40 to 60 cm from the respective pairs of pole pliers, the two low-voltage conductors extending into the housing where they are mechanically secured and the housing having disposed therein, for instance, a varistor such as a metal oxide varistor and a gas-filled surge arrester which—being electrically parallel-connected—are electrically connected via corresponding connecting portions both to the first low-voltage conductor and to the second low-voltage conductor.

The protective circuit of the jumper cable according to the invention comprises at least a voltage-dependent resistor having a forward voltage which is about 20 to 60 V in excess of the operating voltage of conventional starting batteries for motor vehicles. Preferably, a voltage-dependent resistor having a forward voltage of about 40 to 60 V is provided; it is especially preferred that the forward voltage is about 40 V. Such a resistor should exhibit a fast response so that even short-time peak voltages of but a few microseconds are reliably arrested via said resistor. The response of the voltage-dependent resistor should therefore be within the microsecond range, preferably within the nanosecond range.

Battery jumper cables are designed for a long life of ten and more years. The voltage-dependent resistor must have a repeated load capability, wherein voltages of up to more than 1000 V may occur. The currents normally do not exceed 1 milli-ampere. Even repeated loading must not affect the current/voltage characteristic of the resistor, and, especially, this characteristic must not decrease to reliably exclude any leakage current already at a typical operating voltage of a conventional 24 V starting battery. Conventional, commercially available varistors, especially metal oxide varistors, satisfy these requirements and may be selected in accordance with such requirements.

Instead of a varistor, the protective circuit provided in accordance with the present invention may also comprise other, analogously acting arrays of electronic parts and components. Such an array, for instance, is an anti-parallel connected array of two Z-diodes. Such Z-diodes are available with precisely defined forward voltage and have an extremely fast response in the nanosecond range. Furthermore, the voltage-dependent resistors or "voltage-dependent switches" may be thyristors. While being of comparatively small design, such thyristors are able to carry high loads. In case of a sufficiently dimensioned thyristor an additional protective circuit need not be provided. The gate current for the additional switching of the thyristor may be derived from the voltage impulse. Advantageously, it is also possible to use an array of two anti-parallel connected thyristors, a so-called Triac circuit.

In addition to the above-defined voltage-dependent resistor with a forward voltage of about 40 to 60 V and a fast response in the nanosecond or microsecond range, the protective circuit provided in accordance with the present invention may comprise a protective device for protecting the resistor from higher current/voltage influences. Such a protective device is, especially, a gas-filled surge arrester. The response or forward voltage of the surge arrester is higher than the forward voltage of the voltage-dependent resistor, especially the metal oxide varistor, and should preferably be at least 90 V. The surge arrester should likewise have a fast response at least in the microsecond range.

A parallel circuit of such a voltage-dependent resistor and its protective means, for instance, of a metal oxide varistor and a gas-filled surge arrester, is provided. The advantages of such surge arresting devices including a parallel connection of varistor and spark gap are known to those skilled in the art and are specified, for instance, in the above-mentioned patent specifications—such as DE-OS 2,920,979, DE-PS 2,718,188 or DE-PS 3,228,471—so that no further discussion is required in this respect.

The voltage-dependent resistor and the selectively provided protective means therefor are preferably permanently mounted on a p.c. board, an assembly aid or other substrate where also the inner connecting contacts of the two conductor sections of the third conductor, which lead to the first and second low-voltage conductor, respectively, terminate. Preferably, these conductor sections are mechanically secured to the p.c. board, the assembly aid or other substrate by means of connection clamps, connectors or the like so as to provide an assembly of high tensile strength.

Adjacent each voltage-dependent resistor, a heat-dissipating terminal or other heat sink may be provided which is preferably also secured to the p.c. board, the assembly aid or other substrate.

The entire assembly, which is composed of substrate, voltage-dependent resistor, connecting contacts of the third conductor or connecting sections of the resistor and/or the selectively provided protective means as well as heat-dissipating terminal or the like, is preferably embedded or encapsulated in a plastic material that is resistant to water, lubricant and fuel. Inside of the housing, a respective section of the two low-voltage conductors is preferably mechanically fixed to the substrate or the like. The plastic material of the housing is hermetically bonded to the insulating material of the low-voltage conductors and/or the selectively provided third conductor, for instance, by welding or bonding. A durable, robust and stable assembly is obtained which is able to withstand typically rough service conditions of a battery jumper cable for many years.

Below, preferred embodiments of the invention will be described in detail with reference to the drawings.

BRIEF DESCRIPTION OF THE DRAWINGS

FIG. 10a illustrates a connector box in which connections are made between first and second low voltage conductors.

FIG. 10b illustrates the use of an insulation piercing connector means to make electrical connection with one of the low voltage conductors.

DETAILED DESCRIPTION OF THE PREFERRED EMBODIMENT

Figure 1:
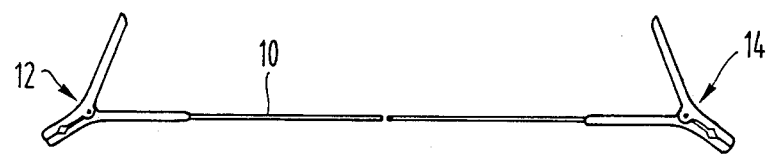
FIG. 1 is a schematic view of the components of a conventional battery jumper cable.
Figure 1:
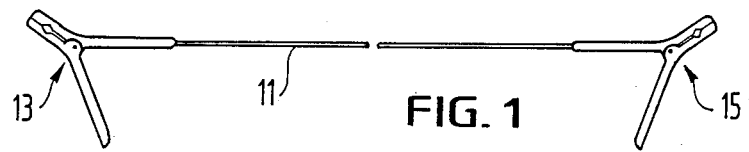

FIG. 1 illustrates schematically the component parts of a conventional battery jumper cable. These components comprise a first low-voltage conductor 10 having provided on each of the two conductor ends a pair of electrically insulated pole pliers 12 and 14. Said components further comprise a second low-voltage conductor 11 having provided on each of the two conductor ends a pair of electrically insulated pole pliers 13 and 15. Further details of such conventional jumper cables and the safety specifications therefor, may be found in DIN 72,553 in the draft version of February 1987.

Figure 2:
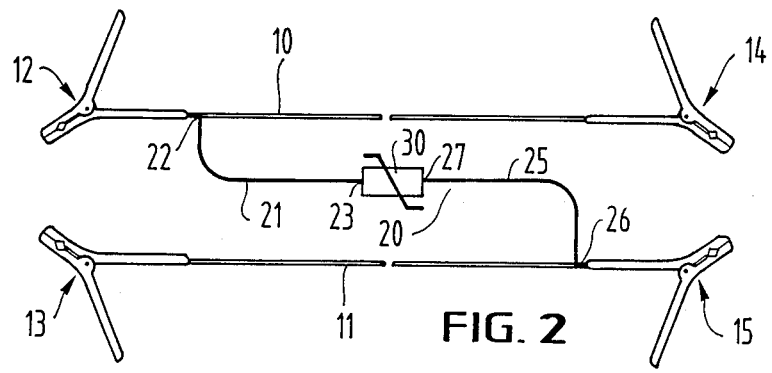
FIG. 2 is a schematic view of a first embodiment of the battery jumper cable according to the present invention, comprising an electrical connection configured as a third conductor in which a voltage-dependent resistor is disposed.

FIG. 2 illustrates schematically a first embodiment of the jumper cable according to the present invention. In addition to the above-mentioned component parts 10 to 15, an electrical connection is provided which in the present case takes the form of a third conductor 20 having disposed therein a voltage-dependent resistor 30, for instance a metal-oxide varistor (MOV) or a Triac circuit made up of thyristors. Said third conductor 20 comprises two conductor sections 21 and 25. The end portion 22 of the on conductor section 21 is electrically connected to the first low-voltage conductor 10. The terminal 23 of said conductor section 21 is electrically connected to one side of the voltage-dependent resistor 30. The terminal 27 of the other conductor section 25 is electrically connected to the other side of the voltage-dependent resistor 30. The end portion 26 of said conductor section 25 is electrically connected to the second low-voltage conductor 11.

The voltage-dependent resistor 30 typically has a forward voltage of about 40 V. When voltage peaks of a significantly higher voltage occur during the typical use of the jumper cable, especially when the pole pliers are removed from the battery poles, the current may flow via the third conductor 20 and the voltage-dependent resistor 30 between the first and second low-voltage conductors 10 and 11, respectively, so that these peak voltages are reduced and made harmless before being able to affect any components of the expensive vehicle electronics.

Figure 3:
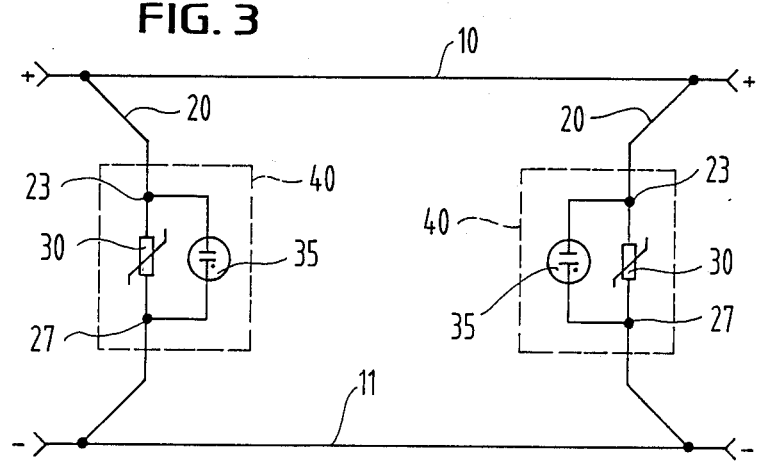
FIG. 3 is a schematic and fragmentary view of a further embodiment of the battery jumper cable according to the present invention including two third conductors each having a parallel-connected circuit composed of a voltage-dependent resistor and a gas-filled surge arrester disposed therein.

FIG. 3 illustrates schematically a section of a further embodiment of the jumper cable according to the present invention. Here, the protective electronic circuit comprises two respective third conductors 20 in which a voltage-dependent resistor 30 and a gas-filled surge arrester 35, which are connected in parallel, are respectively disposed. The one third conductor 20 connects the first low-voltage conductor 10 to the second low-voltage conductor 11 in close proximity to the two pairs of pole pliers—not illustrated—which in use are mounted on the same vehicle or the starting battery thereof. The other third conductor 20 likewise connects the first low-voltage conductor 10 to the second low-voltage conductor 11 in close proximity to the two other pairs of pole pliers—not illustrated—which in use are mounted on the other vehicle or the starting battery thereof. In the illustrated embodiment, the two voltage-dependent resistors 30 are metal oxide varistors having a forward voltage of about 40 V. The gas-filled surge arrester 35 has a switching impulse sparkover voltage of at least 90 V and can withstand temporary current surges of several kilo-amperes. This surge arrester 35 is able to switch within the microsecond range and thus protects the metal oxide varistor 30 from excessive current influences. Surge arresters 35 of this type are commercially available.

As indicated schematically in FIG. 3, the metal oxide varistor 30, the gas-filled surge arrester 35 and the terminals 23 and 27 of the third conductors 20 may be mounted on a p.c. board, an assembly aid or other substrate accommodated within an encapsulated housing 40 which is schematically indicated by dashed lines.

Figure 4:
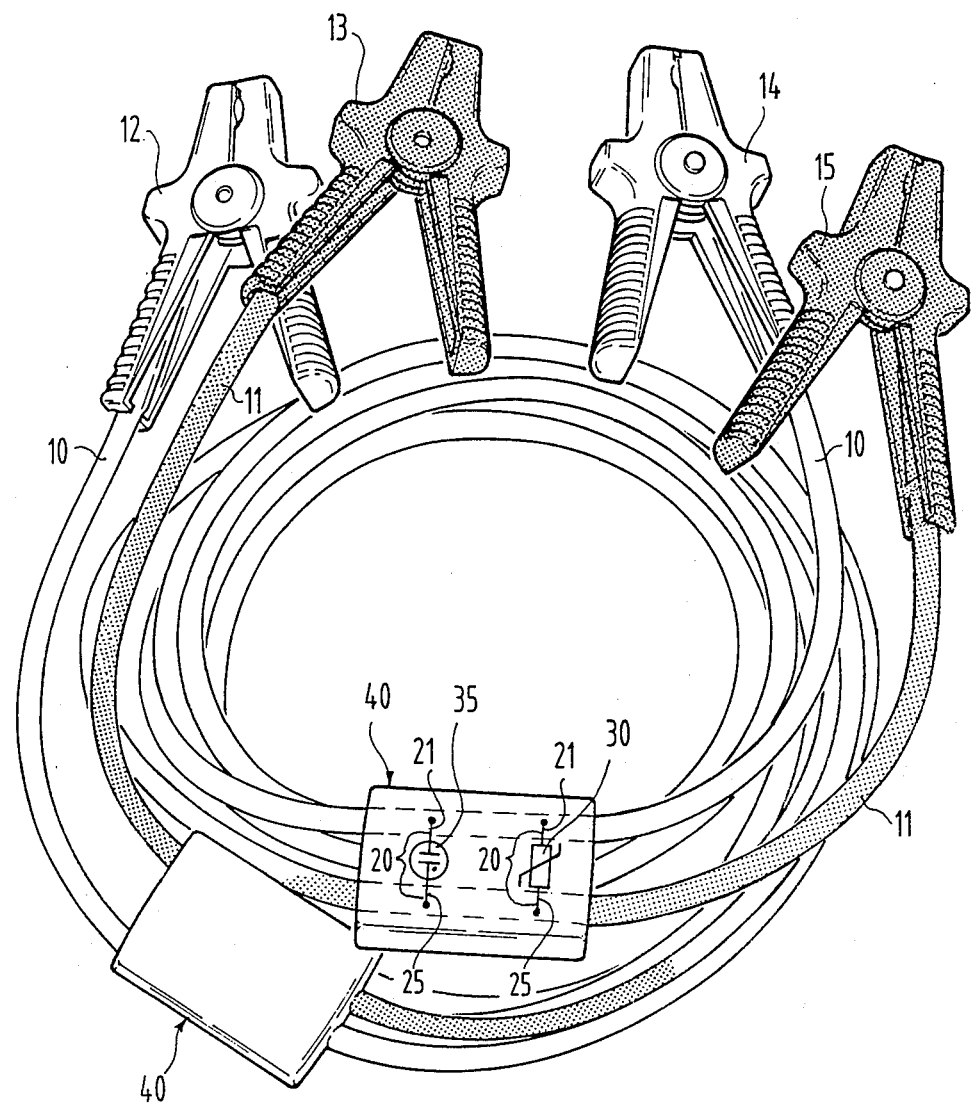
FIG. 4 is a schematic practical embodiment of a battery jumper cable according to the present invention, in which the electrical connections merely consist of the terminal portions of each voltage-dependent resistor.

FIG. 4 illustrates a practical embodiment of a battery jumper cable according to the present invention the protective electronic circuit of which comprises two identical devices. Each device is disposed at a distance of about 40 to 60 cm from two adjacent pairs of pole pliers 12, 13 or 14, 15 and comprises a housing 40 through which sections of the first and the second low-voltage conductors 10 and 11 are passed. Connectors—not illustrated—provide for a mechanically strong connection between the housing 40 and the sections of the two low-voltage conductors 10 and 11. Within each housing 40 there are provided on a p.c. board—not illustrated—or on another substrate a metal oxide varistor 30 and a gas-filled surge arrester 35. Both the metal oxide varistor 30 and the surge arrester 35 are electrically connected via respective connecting portions 21 to the first low-voltage conductor 10 and via respective further connecting portions 25 to the second low-voltage conductor 11. The connecting portions 21 and 25, which are associated with a predetermined voltage-dependent resistor 30, 35, together constitute an electrical connection 20 in which said resistor 30 or 35 is respectively disposed. Each connecting portion 21, 25 may be formed as a conductive track on a p.c. board or as a contact of an insulation piercing device, as a connector pin or other terminal element.

Figure 5:
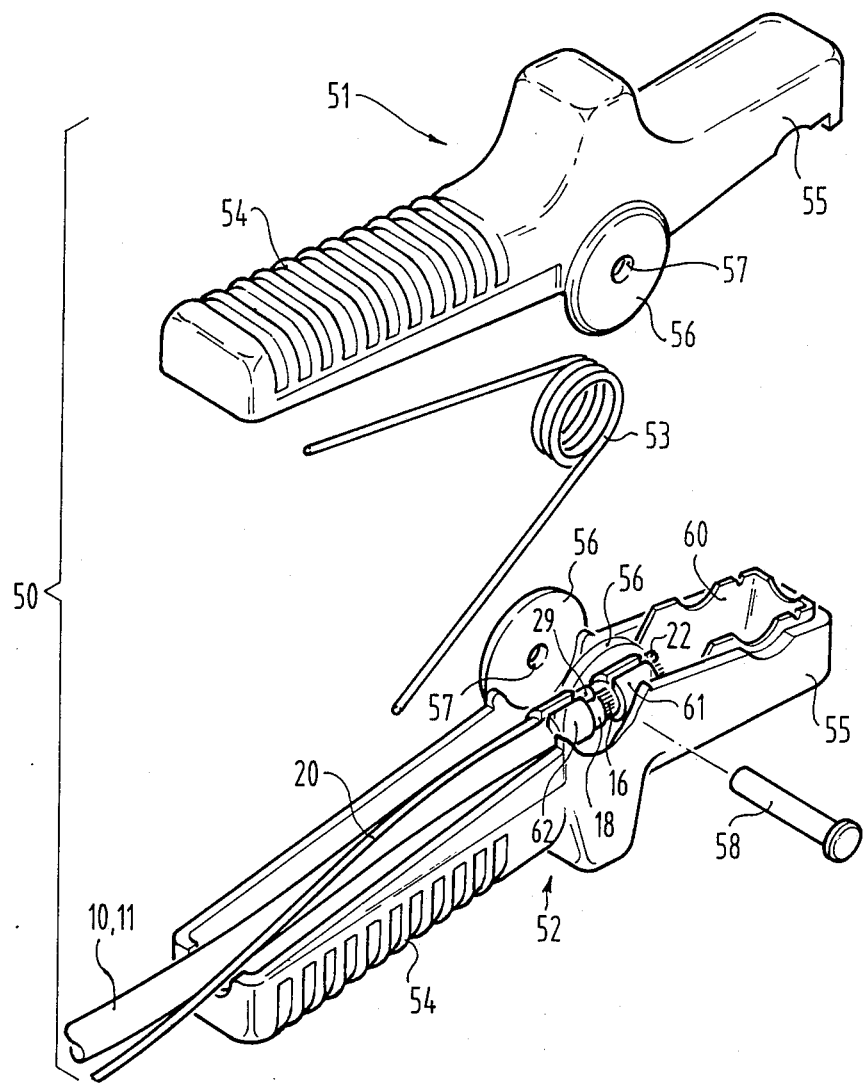
FIG. 5 is an exploded perspective and partially broken view of a pair of fully-insulated pole pliers the metallic jaw of which has mounted thereon both the end portion of a low-voltage conductor and the end portion of a third conductor.

FIG. 5 illustrates a preferred embodiment of mounting a third conductor on the metallic jaw of a pair of pole pliers to which a low-voltage conductor is electrically connected.

All of the pairs of pole pliers 12 to 15 are of identical and preferably fully insulated design which will be explained below with reference to FIG. 5 in conjunction with the pole pliers 50. Each pair of pole pliers 50 substantially comprise two shell-like halves 51 and 52 and a spring 53. Each shell-like half 51, 52 is made of a dimensionally stable, electrically non-conducting plastic material such as polyethylene, polypropylene or polyamide and includes a handle 54, a grip 55 and two bearing disks 56. In the center of both bearing disks 56 bores 57 are formed through which in the assembled state a pin 58 is passed which serves as a pivot and retaining means for the spring 53 the terminal legs of which are in engagement inside the handle 54 of each shell-like half 51 and 52 and the spring tension of which continuously tends to urge the grips 55 towards each other.

Within each plastic grip 55 a metal jaw 60 is secured. The jaw 60 includes two metallic connectors 61 an 62. The one connector 61 is in engagement around the parallel bared wires 16 of the low-voltage conductors 10, 11 and the bared terminal 22 of the third conductor 20. Good electrical contact between the conductors 16, 22 and the remaining metallic jaw 60 is provided by strong mechanical crimping of the legs of said clamp 61. The second connector 62 is in engagement about the insulation 18 of the low-voltage conductors 10, 11 and the insulation 29 of the third conductor 20. By sufficient compression of the legs of the second clamp 62 a connection of high tensile strength between the low-voltage conductors 10, 11 and the third conductor 20, on the one hand, and the metallic jaw 60 and thus the pair of pole pliers 50, on the other hand, is provided.

Figure 6:
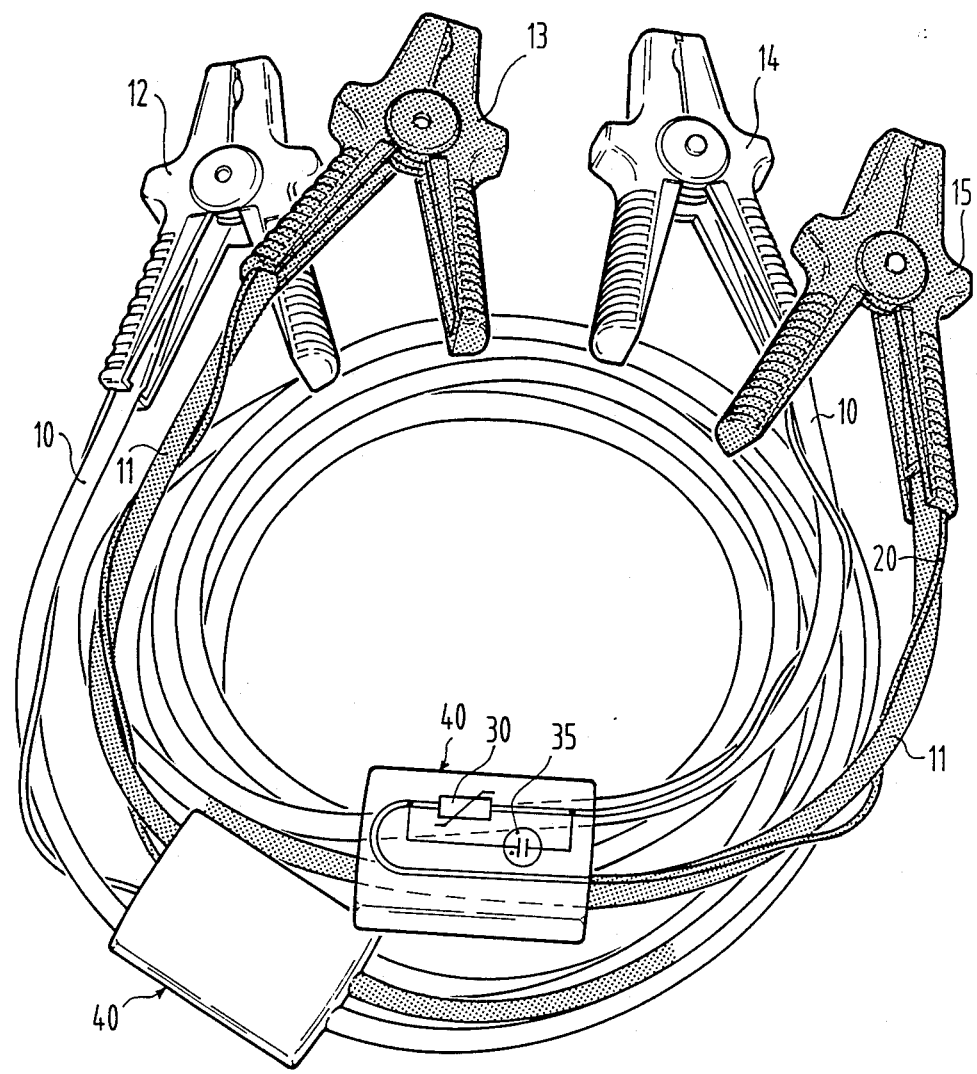
FIG. 6 is a schematic view of a further practical embodiment of the battery jumper cable according to the present invention.

The direct connection of the end portion or terminal contact 22 of the third conductor 20 to the metallic jaw 60 of a pair of pole pliers 50 reduces self-induction to minimum. FIG. 6 illustrates a further practical embodiment of a jumper cable according to the present invention comprising a protective electronic circuit.

The first two pairs of pole pliers 12 and 14 are electrically interconnected via a first low-voltage conductor 10. The second two pairs of pole pliers 13 and 15 are electrically interconnected via a second low-voltage conductor 11. A respective third conductor 20 electrically interconnects the first low-voltage conductor 10 and the second low-voltage conductor 11. The connection can preferably be made by joint termination of the copper wires of the low-voltage conductors 10 and 11, respectively, and the third conductor 20 to a metallic jaw in each of the pairs of pole pliers 12, 13, 14, 15, as explained above with reference to FIG. 5.

Each third conductor 20 includes a parallel array of a metal oxide varistor 30 and a gas-filled surge arrester 35 therein. Each of these arrays is provided within a housing 40 which also surrounds corresponding sections of the two low-voltage conductors 10 and 11 in a force fit.

Figure 7:
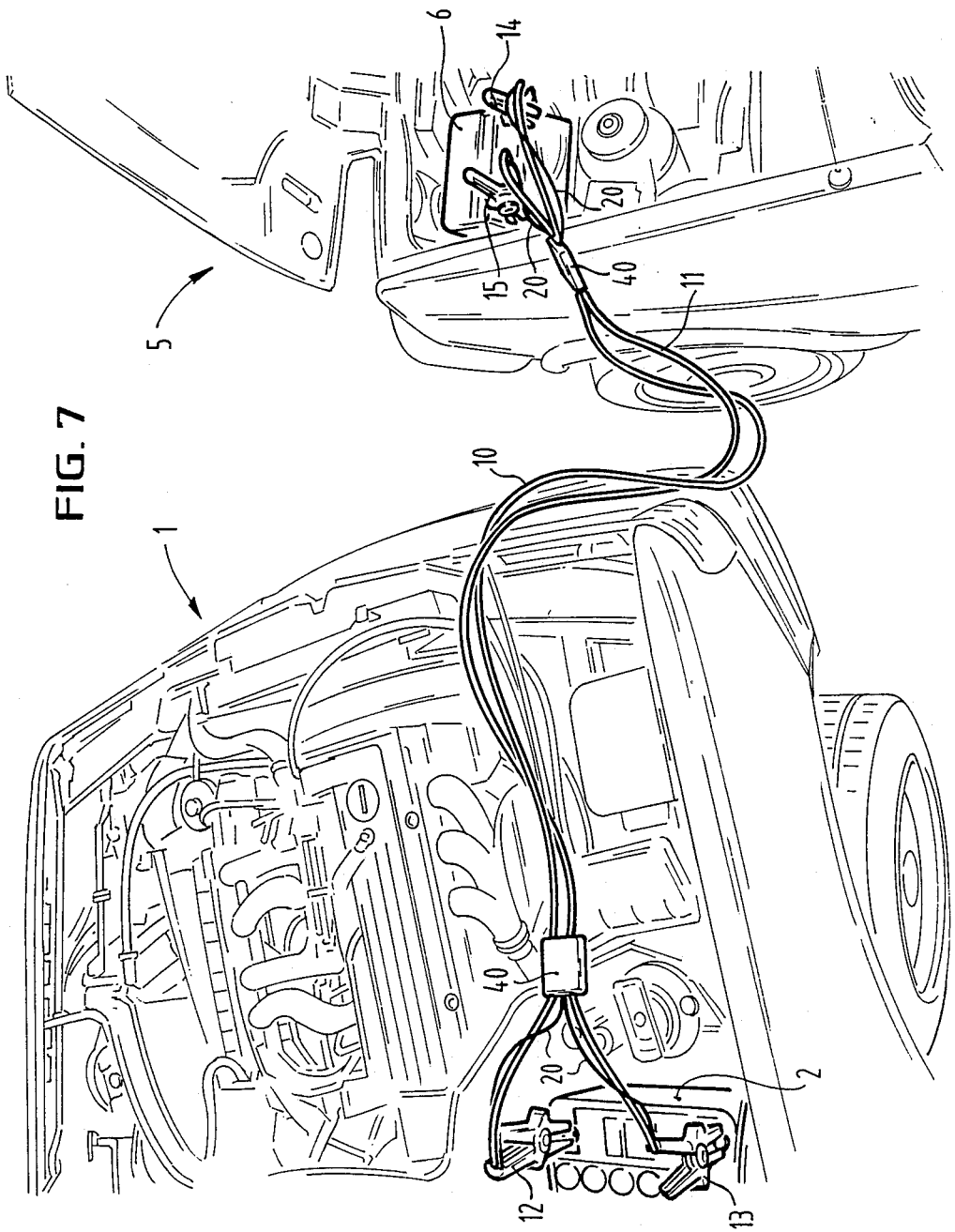
FIG. 7 illustrates the use of the battery jumper cable of FIG. 6 in practice.

FIG. 7 illustrates schematically the manner in which a jumper cable according to the present invention is used.

Both a first vehicle 5 including a discharged storage battery 6 and a second vehicle 1 including a powering storage battery 2 are illustrated schematically in a fragmentary view showing the engine compartments.

When the jumper cable is to be used, the pole pliers 14 are fixed to the positive pole of the discharged storage battery 6 while the pole pliers 12 are fixed to the positive pole of the powering battery 2. Then, pole pliers 13 are fixed to the negative pole of the powering battery 2 and thereafter pole pliers 15 are fixed to the negative pole or to the ground strap or another uninsulated location grounded to the engine block of the vehicle 5 having the discharged storage battery 6. Pole pliers 12 and 14 are electrically interconnected via low-voltage conductor 10. Pole pliers 13 and 15 are electrically interconnected via low-voltage conductor 11. The engine of the powering vehicle 1 is started and operated until an intermediate speed of revolution has been reached. Subsequently, the engine of the disabled vehicle 5 is started. When the latter engine runs smoothly, the pole pliers of the jumper cable are removed in reverse of the above order.

Figure 8:
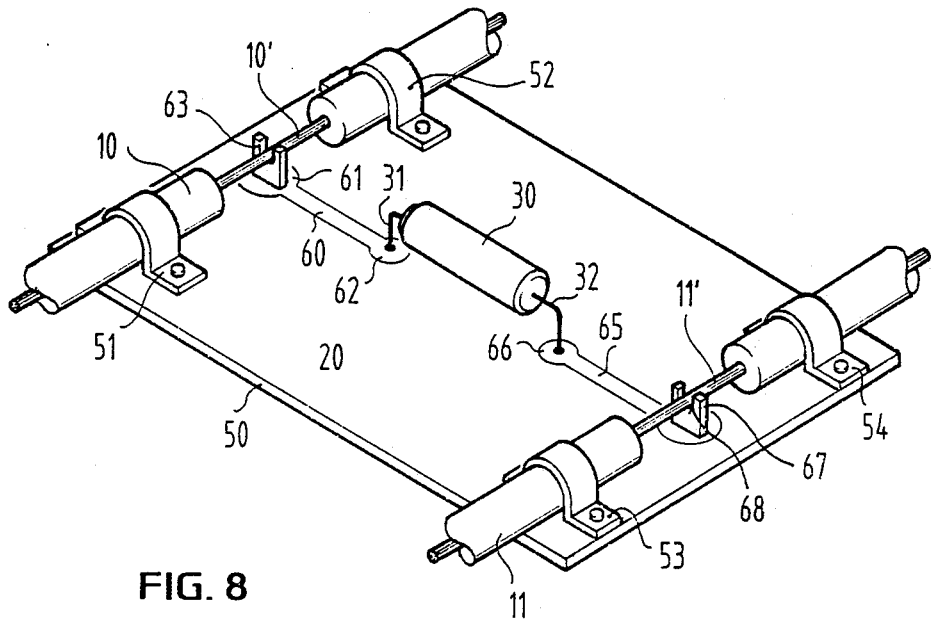
FIG. 8 is an illustration of the connection between first and second low voltage conductors using a printed circuit means.

Referring to FIG. 8 a further embodiment of the invention is explained wherein a current flow path for short-time peak voltages connecting the first low-voltage conductor and the second low-voltage conductor is realized by printed circuit means. A section of a first low-voltage conductor 10 is secured to a printed circuit board 50 by conventional fastening means 51 and 52. A section of a second low-voltage conductor 11 is arranged parallel and spaced to the first low-voltage conductor 10 and is secured on the same printed circuit board 50 by fastening means 53 and 54. First and second separated sections 60 and 65 of a conductive track made of a thin copper foil are deposited on the printed circuit board 50. The first conductive track section 60 comprises enlarged inner and outer end portions 61 and 62 for preparing soldering connections. Second conductive track section 65 comprises enlarged inner and outer end portions 66 and 67 for preparing soldering connections. The inner enlarged end portions 62 and 66 are connected to a voltage-dependent resistor 30, having a first connector tab 31 and a second connector tab 32. The first connector tab 31 is soldered to the inner end portion 62 and the second connector tab 32 is soldered to the inner end portion 66.

A metallic, U-shaped connector piece 63 is soldered to the outer end portion 61 of the first conductive track section 60. A small piece of insulation is removed from the first low-voltage conductor 10 and an electrically conductive connection is provided between the connector piece 63 and an un-covered metal core 10' of the first low-voltage conductor 10. Similarly, a further metallic, U-shaped connector piece 68 is soldered to the enlarged outer end portion 67 of the second conductive track section 65, and an electrically conductive connection is provided between the connector piece 68 and an un-covered metal core 11' of the second low-voltage conductor 11. Thus, both conductive track sections 60 and 65 including their enlarged end portions 61, 62, and 66, 67, respectively form an electrical connection connecting the first low-voltage conductor 10 and the second low-voltage conductor 11. This connection, shown generally as a third conductor 20, provides a current flow path for short-time peak voltages including the voltage-dependent resistor 30, the forward voltage of the resistor 30, the forward voltage of the resistor 30 exceeding the operating voltage of conventional starting batteries for motor vehicles.

Figure 9:
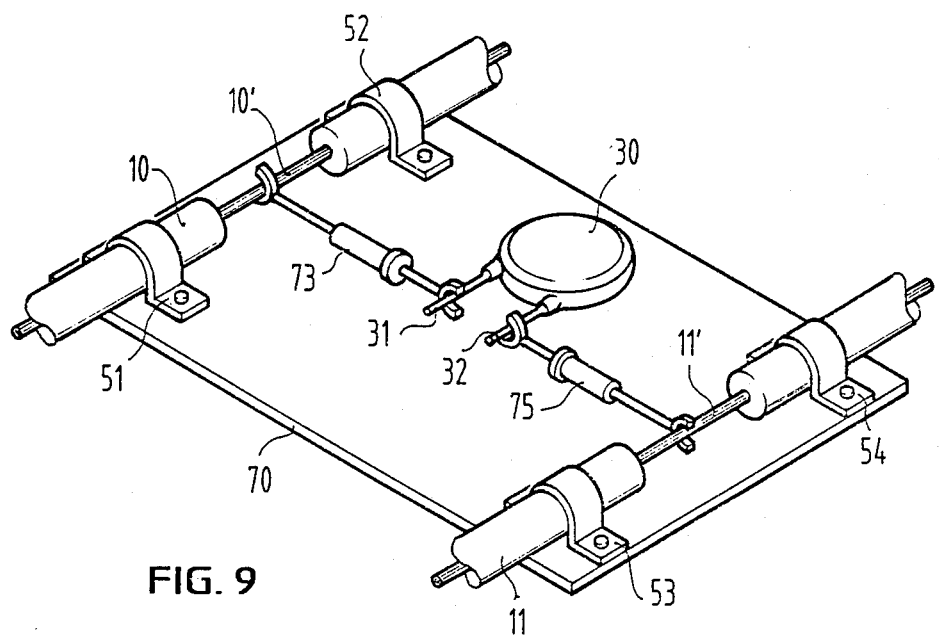
FIG. 9 illustrates an alternative means of making the connection between first and second low voltage conductors.

Referring to FIG. 9 a further embodiment of the present invention providing an electrical connection means connecting the first low-voltage conductor and the second low-voltage conductor so as to provide a current flow path for short-time peak voltages is explained.

Again, a section of a first low-voltage conductor 10 is secured by conventional fastening means 51 and 52 to a rigid plate 70 made from thermo-setting plastics and serving as an auxiliary mounting means. A section of a second low-voltage conductor 11 is arranged parallel and spaced to the first low-voltage conductor 10 and is secured to the plate 70 by fastening means 53 and 54. Further, a voltage-dependent resistor 30 is mounted on the plate 70 such that the connector tabs 31 and 32 of the resistor 30 are extending essentially parallel to the low-voltage conductors 10 and 11. A small piece of insulation is removed from the low-voltage conductors 10 and 11 to provide un-covered metallic cores 10' and 11' of the low-voltage conductors 10 and 11. A metallic connector pin 73 connects the un-covered core section 10' with the connector tab 31, and another metallic connector pin 75 connects the un-covered core section 11' with the other connector tab 32 of the voltage-dependent resistor 30.

Still a further embodiment of said electrical connection means connecting the first low-voltage conductor and the second low-voltage conductor so as to provide a current flow path for short-time peak voltages is explained in the following.

Referring to FIGS. 10a and 10b, a plastic housing 80 comprises a bottom part 81 and a cover part 82 pivotally mounted to the bottom part 81 by a plastic hinge joint 83. The bottom part 81 supports a first insulation piercing connector means 84 and a second insulation piercing connector means 90. Both insulation piercing connector means 84 and 90 are similarly designed. FIG. 10b shows a representative view of the first insulation piercing connector means 84, comprising a first metal plate 85 having a metal spike 88, a circular-like recess 87 and a slot-like recess 89, both recesses being opened to an upper edge 86 of the metal plate 85. The metal spike 88 radially extends from the bottom of the circular-like recess 87 into the center thereof. The opened circular-like recess 87 has dimensions allowing a low-voltage conductor 10 including its insulation 10" to be urged into the circular-like recess 87. Thereafter, the metal spike 88 will penetrate the insulation 10" and will contact a metallic core 10' of the low-voltage conductor 10 providing electrically conductive connection between the low-voltage conductor 10 and the metal plate 85.

A printed circuit board 95 having first and second, separated conductive track sections 96 and 97 on the same surface thereof is inserted in a slot-like recess 89 of the first metal plate 85 and in a similar recess 89 of the second metal plate 85 of the second insulation piercing connector means 90 having a similar metal spike 88. A soldering connection is provided between the first metal plate 85 and the first conductive track section 96; a further soldering connection is provided between the second conductive track section 97 and the second metal plate 85. A voltage-dependent resistor 30 having first and second connector tabs 31 and 32 being disposed adjacent to said surface of said printed circuit board 95. The first connector tab 31 is soldered to the first conductive track section 96 and the second connector tab 32 being soldered to the second conductive track section 97. Thus, a current flow path for short-time peak voltages comprising the first metal spike 88, the first metal plate 85, the first conductive track section 96, the first connector tab 31, the voltage-dependent resistor 30, the second connector tab 32, the second conductive track section 97, the second metal spike and the second metal plate 90 are provided for electrically connecting the first low-voltage conductor 10 and the second low-voltage conductor 11.

Counter pieces 93 extend from the cover part 82 of the housing 81 and will urge each low-voltage conductor 10, 11 into and maintain within its circular-like recess of the respective metal plates 85, 90a after the bottom part 81 and the cover part 82 have been folded together in order to form a closed housing 80.

Although the present invention has been described in terms of exemplary embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

I claim:

1. A battery jumper cable comprising:
   a first electrically insulated flexible low-voltage conductor having a first end portion and a second end portion electrically connected to a first pair of electrically insulated pole pliers and a second pair of electrically insulated pole pliers, respectively;
   a second electrically insulated low-voltage conductor having a first end portion and a second end portion electrically connected to a first pair of electrically insulated pole pliers and a second pair of electrically insulated pole pliers, respectively;
   a third electrically insulated conductor connecting the first low voltage conductor and the second low-voltage conductor in close proximity to said first pairs of pole pliers; and
   a fourth electrically insulated conductor connecting the first low voltage conductor and the second low-voltage conductor in close proximity to said second pairs of pole pliers;
   each of said third and fourth conductors comprising a voltage-dependent resistor having a forward voltage which exceeds the operating voltage of conventional starting batteries for motor vehicles, so as to provide a current flow path for short time peak voltages and block current flow for battery operating voltages.

2. A battery jumper cable as claimed in claim 1 wherein said third conductor is connected to the first pair of pole pliers and said fourth conductor is connected to the second pair of pole pliers.

3. A battery jumper cable as claimed in claim 1 in which the third conductor has a cross-section in the range of 2 to 8 mm$^2$.

4. A battery jumper cable as claimed in claim 1 in which the third conductor has a length of about 60 to about 100 cm.

5. A battery jumper cable as claimed in claim 1 in which the forward voltage of the voltage-dependent resistor exceeds the operating voltage of conventional starting batteries for motor vehicles by at least about 20 V.

6. A battery jumper cable as claimed in claim 1 in which the electrical connection means comprises an array of circuit elements acting analogous to a voltage-dependent resistor, said array exhibiting a forward voltage of about 40 to about 60 V.

7. A battery jumper cable as claimed in claim 1 in which a voltage-dependent resistor is disposed adjacent a heat sink.

8. A battery jumper cable as claimed in claim 1 in which third and fourth electrically insulated flexible conductors are disposed adjacent the first and second pairs of pole pliers respectively, and electrically connect the first low-voltage conductor and the second low-voltage conductor said third and fourth conductor comprise a parallel-connected arrangement of a metal oxide varistor and a gas-filled surge arrester.

9. A battery jumper cable as claimed in claim 1 in which third and fourth electrically insulated flexible conductors are disposed adjacent the first and second pairs of pole pliers, respectively, and electrically connect the first and second pairs of pole pliers, said third and fourth conductors comprising a parallel-connected arrangement of a metal oxide varistor and a gas-filled surge arrester.

10. A battery jumper cable as claimed in claim 1 further comprising at least one auxiliary mounting means on which at least one voltage-dependent resistor and the terminals of the third or fourth conductor are secured, the auxiliary mounting means being disposed in an hermetic enclosure made of plastic material.

11. A battery jumper cable as claimed in claim 10 wherein the auxiliary mounting means is a printed circuit board.

12. A battery jumper cable as claimed in claim 1 in which the third conductor or the fourth conductor or both of them comprise two connecting sections through which at least one voltage-dependent resistor is electrically connected to a first low-voltage conductor and to the second low-voltage conductor.

13. A battery jumper cable as claimed in claim 12 in which the two connecting sections are formed as conductive track sections on a printed circuit board.

14. A battery jumper cable as claimed in claim 12 in which the two connecting sections are each disposed within a housing which is secured to the low-voltage conductors at a distance of about 40 to about 60 cm from the pole pliers and in overlapping engagement about both low-voltage conductors.

15. A battery jumper cable as claimed in claim 12 in which the two connection sections are formed as contacts of an insulation-piercing connector.

16. A battery jumper cable as claimed in claim 12 in which the two connecting sections are formed as connector pins.

17. A battery jumper cable as claimed in claim 1 in which said electrical connection means comprises two parallel-connected voltage-dependent resistors exhibiting different forward voltages.

18. A battery jumper cable as claimed in claim 17 in which a voltage-dependent resistor is a varistor.

19. A battery jumper cable as claimed in claim 17 in which a voltage-dependent resistor is an array of two anti-parallel connected Z-diodes.

20. A battery jumper cable as claimed in claim 17 in which one of said voltage-dependent resistors in a gas-filled surge arrester.

21. A battery jumper cable as claimed in claim 20, in which the gas-filled surge arrestor has a forward voltage of at least 90 V.

22. A battery jumper cable as claimed in claim 17 in which a voltage-dependent resistor is a thyristor.

23. A battery jumper cable as claimed in claim 22, in which a voltage-dependent resistor is an array of two anti-parallel connected thyristors.

* * * * *

UNITED STATES PATENT AND TRADEMARK OFFICE
CERTIFICATE OF CORRECTION

PATENT NO. : 4,869,688

DATED : September 26, 1989

INVENTOR(S) : Raoul Merio

It is certified that error appears in the above-identified patent and that said Letters Patent is hereby corrected as shown below:

ON TITLE PAGE: column 1, item [73] Assignee from "Austria" to --Federal Republic of Germany--.

Signed and Sealed this

Seventh Day of July, 1992

Attest:

DOUGLAS B. COMER

Attesting Officer

Acting Commissioner of Patents and Trademarks